United States Patent
Wang et al.

(10) Patent No.: US 11,813,753 B2
(45) Date of Patent: Nov. 14, 2023

(54) COLLISION AVOIDANCE MOTION PLANNING METHOD FOR INDUSTRIAL ROBOT

(71) Applicant: FANUC CORPORATION, Yamanashi (JP)

(72) Inventors: Changhao Wang, Albany, CA (US); Hsien-Chung Lin, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 218 days.

(21) Appl. No.: 17/249,085

(22) Filed: Feb. 19, 2021

(65) Prior Publication Data

US 2021/0252707 A1 Aug. 19, 2021

Related U.S. Application Data

(60) Provisional application No. 62/978,654, filed on Feb. 19, 2020.

(51) Int. Cl.
*B25J 9/16* (2006.01)
*B25J 13/08* (2006.01)

(52) U.S. Cl.
CPC .......... *B25J 9/1666* (2013.01); *B25J 9/1671* (2013.01); *B25J 9/1676* (2013.01); *B25J 9/1697* (2013.01); *B25J 13/089* (2013.01)

(58) Field of Classification Search
CPC ...... B25J 9/1666; B25J 9/1671; B25J 9/1676; B25J 9/1697; B25J 13/089; G05B 2219/40476; G05B 2219/40477
See application file for complete search history.

(56) References Cited

U.S. PATENT DOCUMENTS

2019/0351550 A1\* 11/2019 Fujii .................. B25J 9/04

FOREIGN PATENT DOCUMENTS

| JP | 2008204161 A | 9/2008 |
| JP | 2016198842 A | 12/2016 |
| WO | 2019009350 A1 | 1/2019 |

OTHER PUBLICATIONS

M. Mukadam, X. Yan and B. Boots, "Gaussian Process Motion planning," 2016 IEEE International Conference on Robotics and Automation (ICRA), Stockholm, Sweden, 2016, pp. 9-15, doi: 10.1109/ICRA.2016.7487091.\*

(Continued)

*Primary Examiner* — Jeff A Burke
*Assistant Examiner* — Blake A Wood
(74) *Attorney, Agent, or Firm* — Shumaker, Loop & Kendrick, LLP; John A. Miller

(57) ABSTRACT

A robot collision avoidance motion planning technique using a worst state search and optimization. The motion planning technique begins with a geometric definition of obstacles, start and goal points, and an initial set of waypoints which may be sparsely spaced. Given an inter-point interpolation method such as linear or spline, a continuous trajectory can be described as a function of the waypoints and an arc length parameter. A worst state search is then performed which finds a location between each adjacent pair of waypoints having a worst state of distance to obstacle, considering all parts of the robot and tool. A collision avoidance constraint is defined using the worst state locations, and an optimization of the waypoint locations is then performed to improve the worst states until all collisions are eliminated and an obstacle avoidance minimum distance criteria is met.

20 Claims, 6 Drawing Sheets

(56) References Cited

OTHER PUBLICATIONS

Mukadam, Mustafa, et al. "Continuous-time Gaussian process motion planning via probabilistic inference." The International Journal of Robotics Research 37.11 (2018): 1319-1340.*

Dong, Jing, et al. "Motion planning as probabilistic inference using Gaussian processes and factor graphs." Robotics: Science and Systems. vol. 12. No. 4. 2016.*

L. Petrović, J. Peršić, M. Seder and I. Marković, "Stochastic Optimization for Trajectory Planning with Heteroscedastic Gaussian Processes," 2019 European Conference on Mobile Robots (ECMR), Prague, Czech Republic, 2019, pp. 1-6, doi: 10.1109/ECMR.2019.8870970.*

Zucker M, Ratliff N, Dragan AD, et al. CHOMP: Covariant Hamiltonian optimization for motion planning. The International Journal of Robotics Research. 2013;32(9-10):1164-1193. doi:10.1177/0278364913488805.*

Matt Zucker, Nathan Ratliff, Anca D. Dragan, Mihail Pivtoraiko, Matthew Klingensmith, Christopher M. Dellin, J. Andrew Bagnell, Siddhartha S. Srinivasa, "Chomp: Covariant hamiltonian optimization for motion planning." The International Journal of Robotics Research 32.9-10 (2013): 1164-1193.

John Schulman, Jonathan Ho, Alex Lee, Ibrahim Awwal, Henry Bradlow and Pieter Abbeel, "Finding Locally Optimal, Collision-Free Trajectories with Sequential Convex Optimization." Robotics: science and systems. vol. 9. No. 1. 2013.

Jia Pan, Sachin Chitta, and Dinesh Manocha, "FCL: A general purpose library for collision and proximity queries." 2012 IEEE International Conference on Robotics and Automation. IEEE, 2012.

Yongxiang Fan, Yujiao Cheng, Shiyu Jin, Changhao Wang, Xinghao Zhu, Masayoshi Tomizuka, "UCB-FANUC Project Activity Report, Jun. 2018-May 2019," University of California at Berkeley, 2019.

* cited by examiner

COLLISION AVOIDANCE MOTION PLANNING METHOD FOR INDUSTRIAL ROBOT

CROSS-REFERENCE TO RELATED APPLICATIONS

This application claims the benefit of the priority date of U.S. Provisional Patent Application Ser. No. 62/978,654, titled COLLISION AVOIDANCE MOTION PLANNING METHOD FOR INDUSTRIAL ROBOT, filed Feb. 19, 2020.

BACKGROUND

Field

The present disclosure relates to the field of industrial robot motion control and, more particularly, to a robot collision avoidance motion planning technique which begins with a definition of obstacles and an initial set of waypoints which may be sparsely spaced, finds a location between each adjacent pair of waypoints having a worst state of distance to obstacle, then performs an optimization of the waypoint locations to improve the worst states until a minimum obstacle avoidance distance criteria is met.

Discussion of the Related Art

The use of industrial robots to perform a wide range of manufacturing, assembly and material movement operations is well known. In many robot workspace environments, obstacles are present and may be in the path of the robot's motion. The obstacles may be permanent structures such as machines and fixtures. The obstacles may also be a workpiece being operated on or a container in which parts are being placed, where the robot must maneuver in or around the workpiece or container while performing an operation. Collisions between the robot and any obstacle must absolutely be avoided.

Prior art techniques for robot collision avoidance motion planning typically involve defining a set of waypoints along a trajectory, and checking for collisions or excessively small clearances at discrete states represented by each of the waypoints. In these techniques, it is possible that collisions with thin obstacles may be missed in the motion planning if the thin obstacle happens to exist in between the pre-defined waypoints. The only reliable way to ensure that thin obstacles are not missed is to define a dense set of waypoints, where the spacing between waypoints is not large enough to allow a thin obstacle to occupy.

Using dense waypoint spacing as needed in prior art techniques creates other problems in turn. One problem with dense waypoint spacing is that it increases motion planning computation time, as inverse kinematic robot configuration computations and collision avoidance optimization calculations must be performed for each waypoint. Another problem with dense waypoint spacing is that it often causes uneven or jerky robot motion, as slowdowns for curvature blending are often needed in proximity to each waypoint.

In light of the circumstances described above, there is a need for an improved robot motion optimization technique which does not require dense waypoint spacing but still reliably identifies and automatically resolves any collisions or minimum distance threshold violations along the robot's trajectory.

SUMMARY

In accordance with the teachings of the present disclosure, a robot collision avoidance motion planning technique using a worst state search and optimization is disclosed. The motion planning technique begins with a geometric definition of obstacles, start and goal points, and an initial set of waypoints which may be sparsely spaced. Given an interpoint interpolation method such as linear or spline, a continuous trajectory can be described as a function of the waypoints and an arc length parameter. A worst state search is then performed which finds a location between each adjacent pair of waypoints having a worst state of distance to obstacle, considering all parts of the robot and tool. A collision avoidance constraint is defined using the worst state locations, and an optimization of the waypoint locations is then performed to improve the worst states until all collisions are eliminated and an obstacle avoidance minimum distance criteria is met.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to a robot collision avoidance motion planning technique using worst state search and worst state optimization is merely exemplary in nature, and is in no way intended to limit the disclosed devices and techniques or their applications or uses.

It is well known to use industrial robots for a variety of manufacturing, assembly and material movement operations. In many robot workspace environments, obstacles are present and may be in the path of the robot's motion—that is, the obstacles may be located between where a robot is currently positioned and the robot's destination position. The obstacles may be structures such as machines, fixtures and tables, and a workpiece or container which is being operated on or around by the robot may itself be an obstacle, as the robot must maneuver in or around the workpiece or container while performing an operation. Techniques have been developed in the art for computing robot motions such that the tool follows a path while avoiding collision of the robot with any obstacle.

Figure 1:
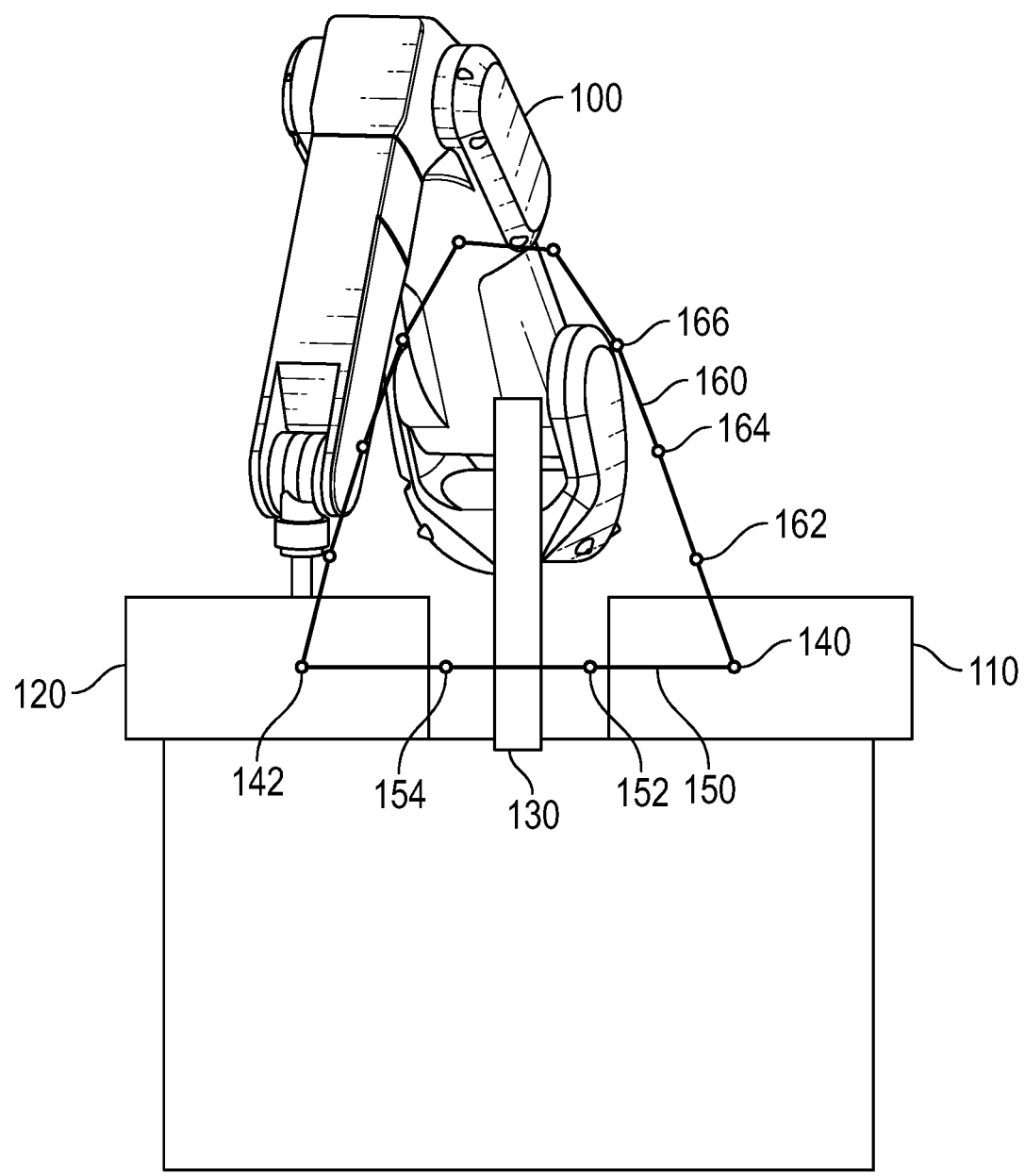
FIG. 1 is an illustration of an industrial robot working near obstacles, where traditional collision avoidance motion planning techniques might fail to identify an obstacle collision if sufficiently dense waypoint spacing is not used.

FIG. 1 is an illustration of an industrial robot working near obstacles, where traditional collision avoidance motion planning techniques might fail to identify an obstacle collision if sufficiently dense waypoint spacing is not used. A robot 100 is performing an operation which may be as simple as moving workpieces from a first container 110 to a second container 120. A divider 130 is located between the containers 110 and 120. The side walls of the containers 110 and 120, and the divider 130, all represent obstacles which must be avoided by all parts of the robot 100—including all of the robot arms, the tool (which might be a finger-type grasper or a suction cup gripper), and the workpiece itself which is being moved.

A start point 140 and a goal point 142 represent the beginning and ending points, respectively, on a path to be traversed by a workpiece. In a workpiece pick and place operation of the type described above, it is common for a vision system (camera or other sensor—not shown) to identify a location in the container 110 of a next workpiece to be moved. It is also common for the destination location of the workpiece to be different from one piece to the next, as compartments within the container 120 are individually filled. Thus, both the start point 140 and the goal point 142 are uniquely identified for each workpiece to be moved, which means that a unique path must be computed for each workpiece. The start point 140 and the goal point 142, along with a geometric definition of the obstacles (the containers 110 and 120, and the divider 130), are provided as input for motion planning calculations.

It is known to define a number of waypoints along the workpiece path, where the initial reference locations of the waypoints may be evenly dispersed along a straight line from the start point 140 to the goal point 142, for example. In prior art motion planning systems, the robot state is computed at each waypoint, and collision avoidance computations are performed at each waypoint state. However, if the waypoints are sparsely spaced, it is possible that prior art motion planning systems might fail to identify an interference condition which exists in between the waypoints. This situation is illustrated in the following discussion, still directed to FIG. 1.

A trajectory 150 is defined as a straight line between the start point 140 and the goal point 142. In addition to the start point 140 and the goal point 142, two waypoints are defined—a waypoint 152 and a waypoint 154. In traditional optimization-based motion planning techniques, an initial reference path is defined, robot states and interferences are computed, and a new path is defined; this is repeated iteratively until a path is found where no collisions exist at any waypoints along the path. However, in the case of the trajectory 150, it may be determined that no collisions occur at either the waypoint 152 or the waypoint 154, and the motion planning system would conclude that the straight line trajectory 150 is a suitable path from the start point 140 to the goal point 142. This is obviously not an acceptable solution, as the robot outer arm and/or tool would collide with the side wall of the container 110, the divider 130 and the side wall of the container 120.

The situation described above occurs because prior art motion planning systems only account for discrete states represented by the waypoints, and do not check for collisions that may occur in between the waypoints. In order to avoid an erroneous solution as described above, it is common for users of prior art motion planning systems to define a dense set of waypoints. For example, instead of four points as used in the trajectory 150 (the start point 140, the goal point 142, and two intermediate waypoints), a trajectory 160 is defined using a total of ten points (the start point 140, the goal point 142, and eight intermediate waypoints). Even if the intermediate waypoints (162, 164, 166, etc.) are initially placed in a straight line between the start point 140 and the goal point 142, collisions will be identified at some of the discrete waypoint states, and the optimization routine will cause the waypoints to move upward until converging to the trajectory 160 which arches up and over all of the obstacles between the start point 140 and the goal point 142.

Figure 2:
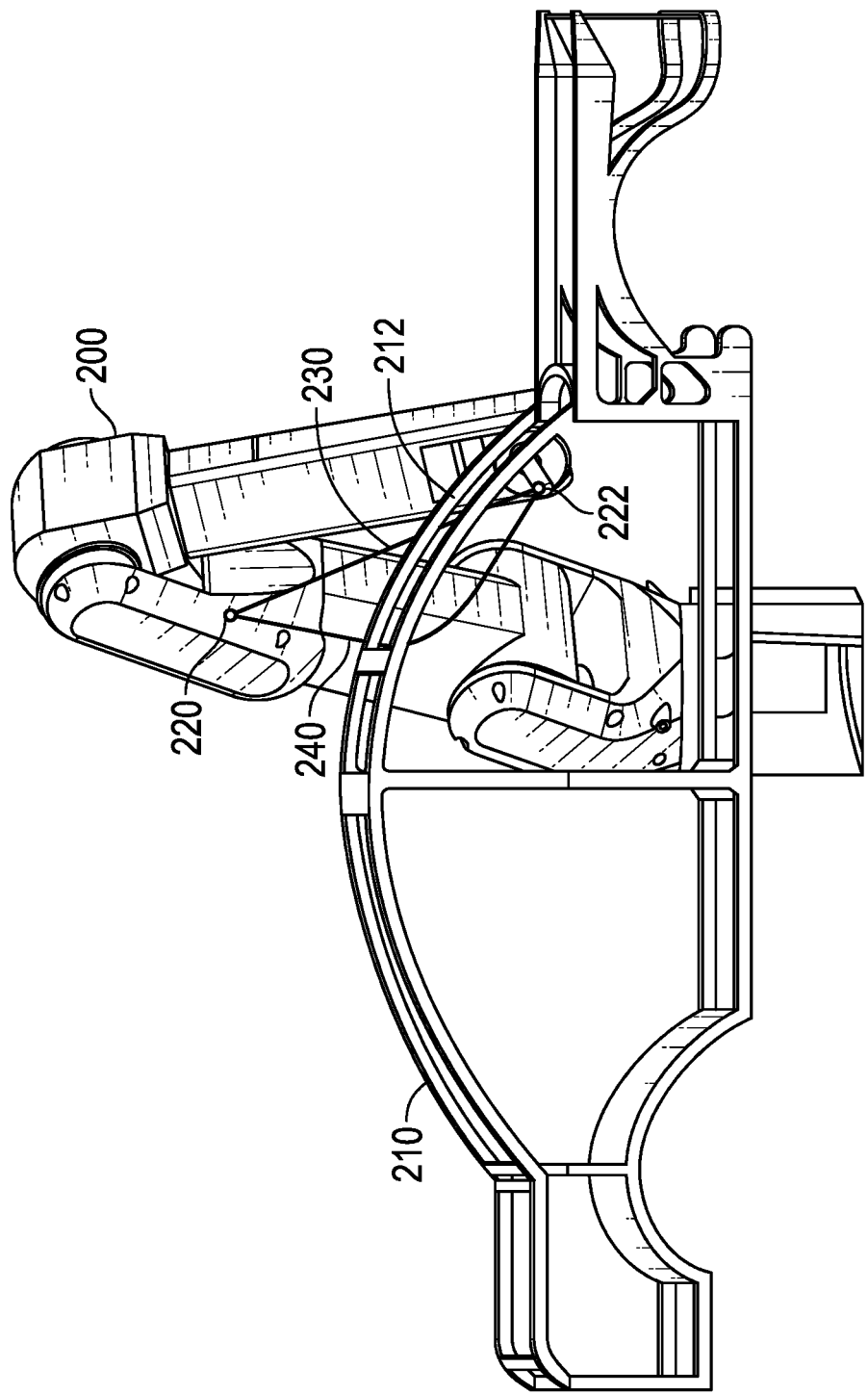
FIG. 2 is an illustration of an industrial robot working near a vehicle body structure, where the vehicle body workpiece itself represents an obstacle which must be avoided, and where traditional collision avoidance motion planning techniques must again use dense waypoint spacing.

FIG. 2 is an illustration of an industrial robot working near a vehicle body structure, where the vehicle body workpiece itself represents an obstacle which must be avoided, and where traditional collision avoidance motion planning techniques must again use dense waypoint spacing. A robot 200 is performing an operation such as spot welding on a vehicle body structure 210. A start point 220 is a home location for the robot 200, and a goal point 222 is the location at which the weld is to be performed (on a part located inside the body structure 210, for example). A roof rail 212 of the body structure 210 occupies a location directly between the start point 220 and the goal point 222.

Based on the discussion of FIG. 1 above, it is easy to envision how a straight-line trajectory 230 could be determined to be collision free. Even if the trajectory 230 is defined with a moderate number of intermediate waypoints (such as five) between the start point 220 and the goal point 222, it is very possible that prior art motion planning systems would fail to detect a collision, because collision avoidance calculations are only performed at discrete waypoint states, and the thin roof rail 212 may pass between waypoints.

If a high enough number of waypoints is defined, prior art motion planning systems will identify a potential collision with the roof rail 212. The collision avoidance constraint will cause the optimization routine to try different locations for the waypoints, and the waypoints will eventually converge to a trajectory 240 which passes around the outside of the body structure 210 (between the base of the robot 200 and the body structure 210) and curves back to the goal point 222.

The dense waypoint spacing needed for reliable collision avoidance in prior art motion planning systems is problematic for two reasons. First, optimization computations (including inverse kinematic robot configuration and interference checking calculations) become increasingly complex and time-consuming as the number of waypoints increases. Second, smooth motion of the robot tool is difficult or impossible to achieve with dense waypoint spacing, because path segment transitions at each waypoint typically cause slowdowns of the tool center point due to the curvatures required at the transitions.

Following is a discussion of a collision avoidance motion planning method which does not require dense waypoint spacing, but reliably identifies collisions in between waypoints along a continuous trajectory and then optimizes waypoint locations to provide a trajectory which is collision-free and which meets obstacle avoidance minimum distance requirements. According to the techniques of the present disclosure, this method includes a two-step worst state search to identify the locations on the continuous trajectory having worst interference conditions, followed by a two-step worst state optimization which moves the waypoints to improve the worst states until collision avoidance requirements are met.

Figure 3:
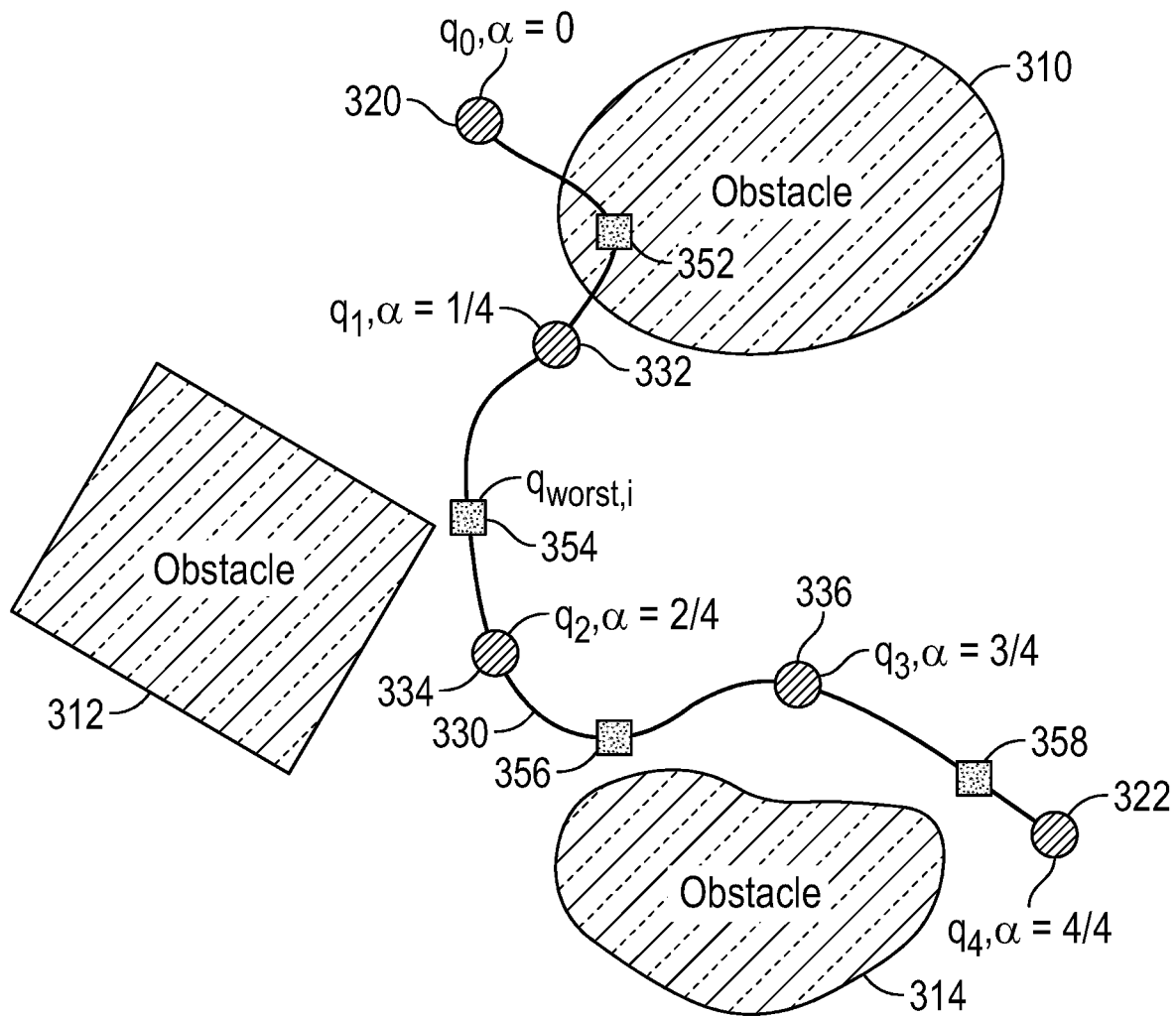
FIG. 3 is an illustration of sequence of waypoints through a an obstacle environment, where a worst state search identifies a location on a trajectory between each pair of waypoints having a worst state distance relative to the obstacles, according to an embodiment of the present disclosure.
Figure 4:
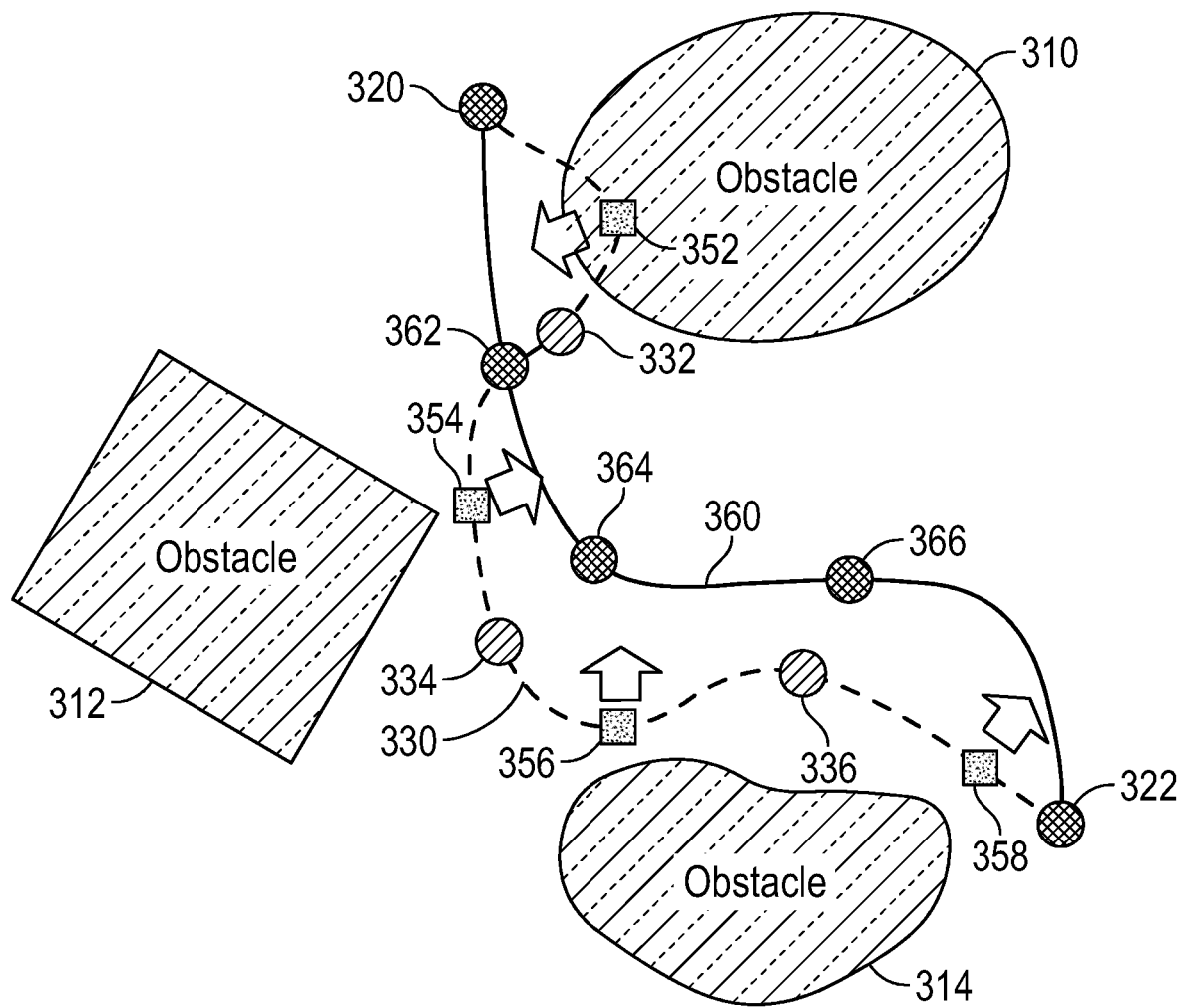
FIG. 4 is an illustration of the initial waypoints and trajectory of FIG. 3, where a worst state optimization moves the waypoint locations to improve the worst states until collision avoidance criteria are met, according to an embodiment of the present disclosure.

FIG. 3 is an illustration of sequence of waypoints through a an obstacle environment, where a worst state search identifies a location on a trajectory between each pair of waypoints having a worst state distance relative to the obstacles, according to an embodiment of the present disclosure. FIG. 3, along with FIG. 4 discussed below, are illustrated as two-dimensional (2D) simply for the sake of clarity. In an actual implementation, the obstacles, and the coordinates of the start and goal points, the way points and the worst state points are all defined in three dimensions, and all of the calculations are handled accordingly. The robot and workpiece are also omitted from FIGS. 3 and 4 for the sake of simplicity and clarity. It is to be understood that the trajectories and waypoints of FIGS. 3 and 4 are ultimately used by a robot to perform an operation, where the final trajectory is the path taken by the robot tool center point, in the manner shown in FIGS. 1 and 2.

In FIG. 3, obstacles 310, 312 and 314 represent any type of object which must be avoided by the robot and the workpiece. As discussed above with respect to FIGS. 1 and 2, the obstacles 310/312/314 could be structures, tools, fixtures, or a large workpiece itself. A human operator in a robot workspace could also be located in a safety zone defined as an obstacle.

A start point 320 and a goal point 322 are defined. The coordinates of each point illustrated in FIGS. 3 and 4 is defined either in Cartesian space in a common fixed coordinate frame such as a robot work cell coordinate frame, or in terms of robot joint positions, discussed further below. The coordinates of the start point 320 and the goal point 322 represent requirements for the operation to be performed, such as the positions a part is to be moved from and to, and the locations of the start point 320 and the goal point 322 therefore cannot be changed. The locations of the start point 320 and the goal point 322 are thus handled as equality constraints in the optimization calculations discussed below. An initial set of waypoints (332, 334 and 336) are defined at locations generally between the start point 320 and the goal point 322. The initial locations of the waypoints 332/334/336 may be defined in any suitable manner—including definition by a human operator using a device such as a teach pendant, automatic selection by a computer based on a previously computed path with similar start and goal points, etc.

FIG. 3 depicts two steps of the disclosed method: state parameterization; and worst state search. Each of these two steps is discussed below. State parameterization involves defining a continuous trajectory 330 as a function of the start point 320, the goal point 322 and the waypoints 332/334/336. Some nomenclature is established as follows. The entire set of all of the points that the trajectory 330 passes through is defined as $q^r$. That is, $q^r$ includes the start and goal points 320/322 and the waypoints 332/334/336. In other words, $q^r=\{q_0, q_1, q_2, q_3, q_4\}$, where the start point 320 is $q_0$, the goal point 322 is $q_4$, and the waypoints 332/334/336 are $q_1, q_2, q_3$ respectively. Each of the points, such as $q_1$, is defined either in Cartesian space (x/y/z coordinates and roll/pitch/yaw), or in joint space $(J_1, J_2, \ldots, J_{n_r})$, where $n_r$ is the degree of freedom of robot).

The continuous trajectory 330 is then defined as a function $g(q^r, \alpha)$, where $\alpha \in [0,1]$ is an arc length parameter, and $q^r$ is the set of all endpoints and waypoints $\{q_0, q_1, q_2, q_3, q_4\}$ as described above. The superscript r stands for "reference", which indicates an initial or previous value in the optimization calculations discussed below. As shown in FIG. 3, the waypoints are equally spaced along the continuous trajectory 330, so that $\alpha=1/4$ at $q_1$, $\alpha=2/4$ at $q_2$, $\alpha=3/4$ at $q_3$, and $\alpha=4/4$ at $q_4$. In order to define the function g, a trajectory interpolation method must be selected. For example, the trajectory 330 could be defined as linear interpolation—where the trajectory is in the form of a straight line from $q_1$ to $q_2$, another straight line from $q_2$ to $q_3$, etc. Selecting an interpolation methods for a set of waypoints is known in the art of robot motion programming.

In the case of linear interpolation of the trajectory 330, the function g, in the section from $q_1$ to $q_2$, is evaluated by:

$$g(q^r,\alpha)=(1-\alpha)q_1+\alpha q_2 \qquad (1)$$

Where all variables were defined above. The function g can be evaluated in a similar manner in all other sections (from $q_2$ to $q_3$, etc.) of the trajectory 330.

Another trajectory interpolation method which may be used is spline interpolation. In one example of spline interpolation of the trajectory 330, the function g, in the section from $q_1$ to $q_2$, is evaluated by:

$$g(q^r,\alpha)=(k_3\alpha^3+k_2\alpha^2+k_1\alpha+1)q_1+(m_3\alpha^3+m_2\alpha^2+m_1\alpha)q_2 \qquad (2)$$

Where k and m are constants which affect the shape of the spline trajectory, and again the function g can be evaluated in a similar manner in all other sections (from $q_2$ to $q_3$, etc.) of the trajectory 330. Other types of trajectory interpolation methods besides linear and spline may also be selected, as would be understood by those skilled in the art.

The preceding discussion completes the state parameterization step of the disclosed method. In summary, given the interpolation method (linear, spline, etc.) and the waypoints $q^r$, the continuous trajectory 330 can be described by the function $g(q^r,\alpha)$, where $\alpha$ is an arc length parameter.

The next step in the process, also shown on FIG. 3, is worst state search. Worst state search involves finding the location along the trajectory 330, in between each adjacent pair of the waypoints $q^r$, having the worst state distance relative to the obstacles—which could be the worst amount of interference with one of the obstacles 310/312/314, or the smallest distance to one of the obstacles 310/312/314. For the trajectory 330, worst state points 352, 354, 356 and 358 are the worst states for the first, second, third and fourth sections of the trajectory 330, respectively. Each of the worst state points is designated as $q_{worst,i}$, where $i=(1, \ldots, 4)$.

In order to find the worst states, the waypoints $q^r$ are fixed, and a one dimension minimization problem can be formulated as follows:

$$\alpha_i^* = \min_{\alpha \in [\alpha_{lb,i}, \alpha_{ub,i}]} Dist(g(q^r, \alpha), Obs) \qquad (3)$$

Where $\alpha_i^*$ is the location $\alpha$ in section i where the worst state occurs, and the distance function $Dist(g(q^r,a),Obs)$ is evaluated by computing a minimum distance (or maximum interference) between all parts of the robot and the obstacles 310/312/314 for a particular point $\alpha$ on the trajectory 330 defined by the function g, where $\alpha$ is allowed to range from a lower bound (lb) of section i to an upper bound (ub) of section i. The minimization problem thus converges to the location $\alpha_i^*$ in the section i where the worst state occurs. The minimum distance (or maximum interference) between all parts of the robot and the obstacles 310/312/314 can be calculated at each point on the trajectory 330 using any suitable technique—such as establishing geometry primitives around each of the robot arms and tool and calculating distances from the primitives to the obstacles, for example.

The minimization problem defined in Equation (3) is solved for each of the trajectory sections. For the trajectory 330 of FIG. 3, $\alpha_i^*$ is found for each of the sections i=(1, . . . , 4). In FIG. 3, the function g uses spline interpolation, as witnessed by the significant curvature of the trajectory 330.

The worst states for a given initial set of waypoints $q_r$ are then identified by evaluating the function g at the points $\alpha_i^*$ as follows:

$$q_{worst,i} = g(q^r, \alpha_i^*) \quad (4)$$

Where $q_{worst,i}$ is the point having the worst state in the section i, and all other variables in Equation (4) were described above.

The worst state points from Equation (4), $q_{worst,i}$, for i=(1, . . . , 4) are the worst state points 352, 354, 356 and 358 shown on FIG. 3 and discussed above. The worst state point 352 ($q_{worst,1}$) has a maximum interference with the obstacle 310. The worst state point 354 has a minimum distance to the obstacle 312. The worst state points 356 and 358 both have minimum distances to the obstacle 314.

FIG. 3 and the preceding discussion are summarized as follows. In the state parameterization step, given the interpolation method (linear, spline, etc.) and the waypoints $q^r$, the continuous trajectory 330 is described by the function $g(q^r, \alpha)$, where $\alpha$ is the arc length parameter. Then in the worst state search step, the worst states in the continuous trajectory are found using Equations (3) and (4).

FIG. 4 is an illustration of the waypoints $q^r$ and the trajectory 330 of FIG. 3, where a worst state optimization moves the waypoint locations to improve the worst states until collision avoidance criteria are met, according to an embodiment of the present disclosure. The worst state optimization consists of two steps; finding the relation between the collision avoidance constraint and the waypoint locations, followed by the worst state optimization itself. Both of these steps are depicted in FIG. 4 and discussed below.

Given the values of $q_{worst,i}$ from Equation (4), with the locations $\alpha_i^*$ fixed, the inequality constraint at the worst state point $q_{worst,i}$ can be written as:

$$\text{Dist}(q_{worst,i}, \text{Obs}) = \text{Dist}(g(q, \alpha_i^*), \text{Obs}) \geq d_{safe} \quad (5)$$

Where $d_{safe}$ is a predefined collision avoidance threshold criteria (minimum safe clearance distance—such as 50 mm), and the only variable is the new set of waypoint locations q.

The objective of the worst state optimization is to move the waypoints from their initial locations $q^r$ to a new set of locations q. The first and last waypoints, $q_0$ and $q_4$, cannot be moved as discussed earlier. Only intermediate waypoints can be moved to improve the worst states. In order to set up the optimization problem, the relation between the collision avoidance constraint and the waypoint locations q must be further refined. The partial derivative of the worst state over other waypoints is calculated to determine the relationship between the worst state and all of the waypoints.

By using a first order Taylor expansion with chain rule, the metric value of the worst state as a linear combination of each waypoint can be approximated. Therefore, the relationship between the worst state and each of the waypoints is approximated by the partial derivative of the collision metric, as follows:

$$\text{Dist}(q_{worst,i}) \approx \text{Dist}(q_{worst,i}^r) + \sum_{j=0}^{n} \frac{\partial \text{Dist}(q_{worst,i})}{\partial g(q)} \frac{\partial g(q)}{\partial q_j}(q_j - q_j^r) \quad (6)$$

Where the Dist function and the function g were described above, and the notation for the different instances of g were also discussed above, including the superscript r designating a reference value from the previous iteration.

Equation (5) above establishes a collision avoidance constraint in terms of the worst states found at the locations $\alpha_i^*$ and a new set of waypoint locations q. Equation (6) approximates the collision avoidance constraint in a form suitable for numeric solution in an optimization routine.

In the worst state optimization step, an optimization problem is formulated having an objective function and one or more constraints. The objective function is typically chosen to achieve certain trajectory characteristics such as minimum distance and/or smoothness. One example of an objective function is $$\min_q w_1 \|q - q^r\| + w_2 \|\nabla q\| + w_3 \|\nabla^2 q\| \quad (7)$$

Where the w values are weighting factors, the $\|q-q^r\|$ term represents the amount of distance between the new waypoints and the reference waypoints, the $\|\nabla q\|$ term represents an approximation of the path length through the waypoints, and the $\|\nabla^2 q\|$ term represents a curvature or smoothness metric. Other objective functions may be defined as suitable for a particular application.

Several constraint functions may be defined for the optimization problem. One typical constraint used in robot motion optimization is that the robot joints must remain within known joint position limits when moving the tool along the trajectory. Joint position limits may be defined as inequality constraints. Another constraint is that the start and goal points of the trajectory, which are the points 320 and 322, must remain at the prescribed locations. Start and goal point locations may be defined as equality constraints. In addition, as discussed above, the worst state collision metric represented in partial derivative form in Equation (6) may be defined as an inequality collision avoidance constraint as follows:

$$\text{Dist}(q_{worst,i}) \approx \text{Dist}(q_{worst,i}^r) + \sum_{i=0}^{n} \frac{\partial \text{Dist}(q_{worst,i})}{\partial g(q)} \frac{\partial g(q)}{\partial q_j}(q_j - q_j^r) \geq d_{safe} \quad (8)$$

$$\forall i = 1, \ldots, n$$

Where, in the above Taylor series expansion, j takes on values from 0 to n, while i takes on values from 1 to n, because j represents the waypoints and i represents the trajectory sections. For example, in FIGS. 3 and 4, n=4 and there are five waypoints and four trajectory sections.

With the worst state optimization problem defined according to the preceding discussion of the objective function and the constraints, different optimization update rules can be applied to update the positions of the waypoints. Possible optimization update rules include algorithms such as SQP (sequential quadratic programming), SQP trust region, or CHOMP (Covariant Hamiltonian Optimization for Motion Planning). When the optimization calculation converges, the new set of waypoint locations q will result.

The collision avoidance inequality constraint included in the optimization calculations causes the optimization solver to "push" the worst states away from the obstacles 310/312/ 314, as illustrated by the arrows in FIG. 4. This has a resulting effect on the locations of the new set of waypoint locations q, which also move incrementally in a direction which helps alleviate the worst states to improve the collision metric.

The optimization calculations described in Equations (7) and (8) yield a new set of waypoint locations q which improve the obstacle avoidance situation relative to the worst states determined for the reference waypoints. Although the new trajectory will be better with respect to obstacle avoidance than the previous trajectory, the new trajectory may not yet meet the collision avoidance criteria. The process therefore loops back to the beginning, such that the new set of waypoint locations q are used as reference waypoint inputs for the trajectory interpolation and worst state search steps discussed earlier. This loop is repeated until a set of waypoint locations q is determined which meets the collision avoidance criteria—that is, the worst state distances all exceed the minimum collision avoidance threshold value $d_{safe}$.

In FIG. 4, the new set of waypoint locations q are shown after final convergence to meet the collision avoidance criteria. A final trajectory 360 begins at the start point 320, ends at the goal point 322, and passes through new waypoints 362, 364 and 366. It can be seen that the final trajectory 360 passes well clear of the obstacles 310/312/ 314. It is emphasized again that the calculations described above are all based on three dimensional geometry (not 2D as shown in FIGS. 3 and 4), and the collision avoidance calculations consider all parts of the robot (i.e., the robot arms and tool, not just the tool center point path which is represented by the final trajectory 360).

Figure 5:
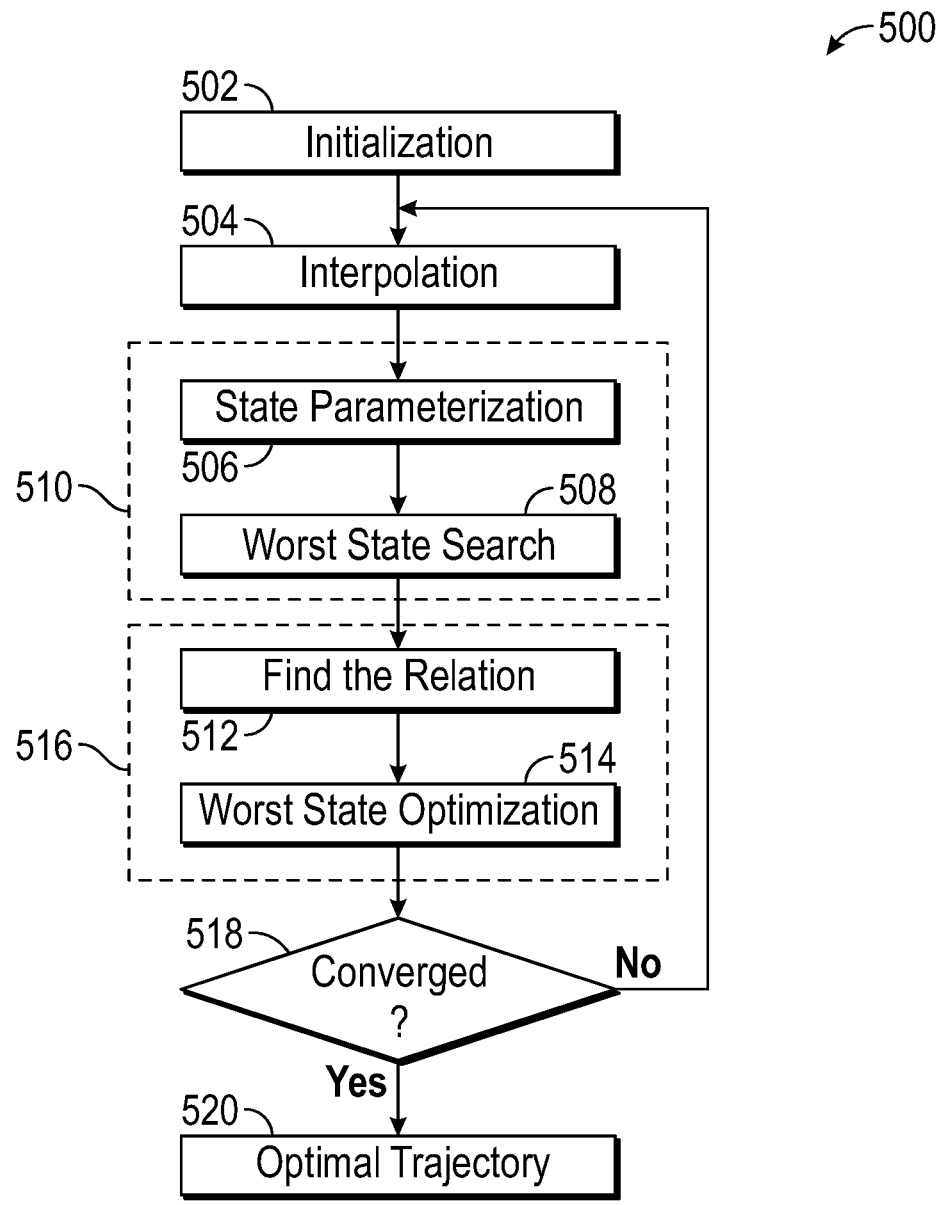
FIG. 5 is a flowchart diagram of a method for robot collision avoidance motion planning using a worst state search and a waypoint optimization based on the worst states, according to an embodiment of the present disclosure.

FIG. 5 is a flowchart diagram 500 of a method for robot collision avoidance motion planning using a worst state search and a waypoint optimization based on the worst states, according to an embodiment of the present disclosure. Initialization is performed at box 502. Initialization includes defining the position of the robot, start and goal points, and obstacles in a common coordinate frame such as a work cell coordinate frame. Initialization also includes calculating the start and goal configurations of the robot using inverse kinematics, based on the start and goal point locations.

In an interpolation step at box 504, reference waypoints from the start point to the goal point are provided, and the robot configuration is computed at each waypoint using inverse kinematics. The first time through the process, the reference waypoints are initial reference waypoints (which may be a straight line from the start to goal point, or waypoints from a previously-planned path with similar start and goal points, or points taught by an operator using a teach pendant device, for example).

At box 506, state parameterization is performed according the earlier discussion. State parameterization includes defining a continuous trajectory as a function of the start point, the goal point and the intermediate waypoints. The continuous trajectory is defined through the waypoints based on an interpolation method (linear, spline, etc.), and an arc length parameter a is defined along the length of the trajectory. At box 508, the worst state search is performed according to the earlier discussion. Worst state search includes finding the location along the trajectory, in between each adjacent pair of the waypoints, having the worst state distance relative to the obstacles. The worst state search finds the location α in each trajectory section where the worst state occurs using Equation (3), and finds the actual worst state point in each trajectory section using Equation (4).

The state parameterization of the box 506 and the worst state search of the box 508 collectively make up the two steps of the overall worst state search process, which is contained in box 510 and was depicted on FIG. 3.

At box 512, finding the relationship between the collision avoidance constraint and the waypoint locations using the worst states is performed according the earlier discussion. Finding the relationship includes using Equations (5) and (6) discussed above. At box 514, the worst state optimization is performed according to the earlier discussion. Worst state optimization includes formulating an optimization problem having an objective function such as the example shown in Equation (7), and one or more constraints. The constraints include a collision avoidance minimum distance inequality constraint, based on the relationship of the worst states to waypoints location, as shown in Equation (8). The worst state optimization yields a new set of waypoints which improve the collision avoidance metric.

The finding the relationship of the box 512 and the worst state optimization of the box 514 collectively make up the two steps of the overall worst state optimization process, which is contained in box 516 and was depicted on FIG. 4.

Following the worst state optimization, at decision diamond 518 it is determined whether the trajectory through the latest set of waypoints meets the collision avoidance minimum distance criteria. If the minimum distance criteria are met, then the trajectory through the latest set of waypoints is used as the final or optimal trajectory at box 520. The final or optimal trajectory is used by the robot controller to control movement of the robot to perform the desired operation (e.g., movement of a workpiece). If the minimum distance criteria are not met, then the process loops back from the decision diamond 518 to the interpolation box 504, where the latest set of waypoints are used as reference waypoints to begin again with state parameterization.

Figure 6:
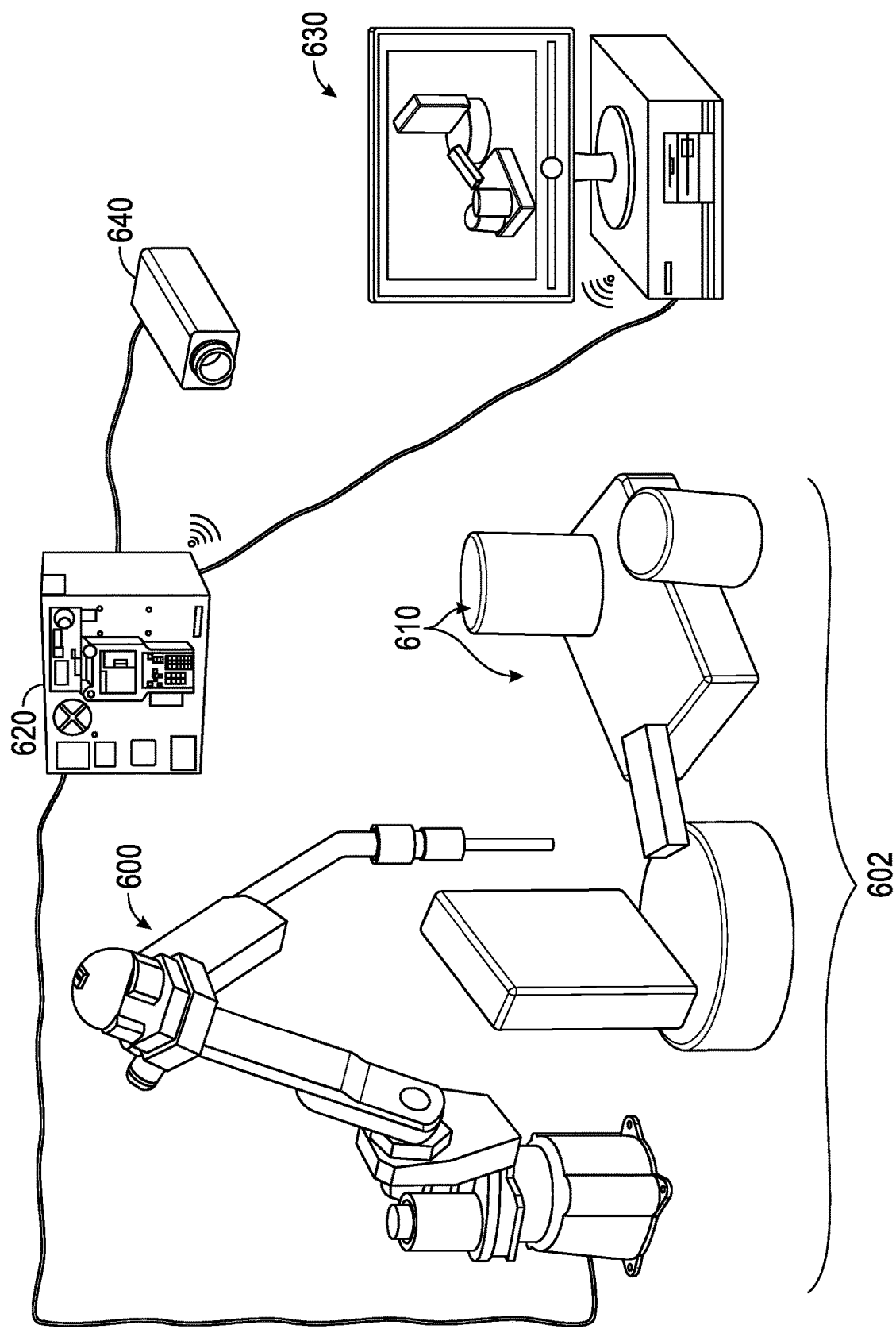
FIG. 6 is an illustration of a robot collision avoidance motion planning system configured to use the method of FIG. 5.

FIG. 6 is an illustration of a robot collision avoidance motion planning system configured to use the worst state search and optimization method of FIG. 5. A robot 600 operates in a workspace 602 including one or more obstacles 610. A controller 620 communicates with the robot 600, typically via a hardwire cable connection as shown. The controller 620 controls the motion of the robot 600 by sending joint motor commands to the robot 600 and receiving joint motor position data from joint encoders in the robot 600, as known in the art.

An optional computer 630, in communication with the controller 620, may be used for several different tasks—including providing obstacle geometry data in the form of CAD solid or surface models. The computer 630, if used, communicates with the controller 620 via any suitable wireless or hardwire network connection. As an alternative to using CAD data to define the obstacles 610, one or more sensors, such as a sensor 640, may be used. The sensor(s) 640 may be a camera or any type of object sensor capable of providing 3D geometry of the obstacles 610 in the workspace 602. The sensor(s) 640 could be one or more 3D cameras, or a plurality of 2D cameras whose data is combined into 3D obstacle data. The sensor(s) 640 could also include other types of devices such as radar, LiDAR and/or ultrasonic. The sensor(s) 640 also communicate with the controller 620 and/or the computer 630 via any suitable wireless or hardwire network connection.

In one embodiment, the controller 620 receives obstacle geometry data from either the computer 630 or the sensor(s) 640. The obstacle geometry data defines the 3D shapes of all of the obstacles 610 which exist in the workspace 602. The controller 620 also determines the start and goal points for the upcoming operation, from sensor data or otherwise. The controller 620 then proceeds to perform the rest of the steps of the flowchart diagram 500, including interpolating robot motions for an initial set of waypoints, and performing the worst state search and worst state optimization calculations until collision avoidance criteria are met. The controller 620 then computes motion commands for the final trajectory and provides the commands to the robot 600.

In another embodiment, the computer 630 performs most of the computations—including receiving obstacle data and start/goal points, interpolating initial waypoints, and performing the worst state search and worst state optimization calculations until collision avoidance criteria are met. In this embodiment, the computer 630 provides the final optimal trajectory and waypoints to the controller 620, and the controller 620 computes the corresponding motion commands and provides the commands to the robot 600. The computing responsibilities may be divided up in any suitable fashion between the computer 630 and the controller 620.

Throughout the preceding discussion, various computers and controllers are described and implied. It is to be understood that the software applications and modules of these computer and controllers are executed on one or more computing devices having a processor and a memory module. In particular, this includes a processor in each of the robot controller 620 and the computer 630 (if used) discussed above. Specifically, the processor in the controller 620 and/or the computer 630 (if used) is configured to perform the collision avoidance path planning computation using the worst state search and worst state optimization in the manner described throughout the foregoing disclosure.

As outlined above, the disclosed techniques for robot collision avoidance motion optimization using a worst state search and worst state optimization provide significant advantages over prior art methods. The disclosed worst state search/worst state optimization technique enables sparse placement of waypoints and yet still finds and eliminates potential interferences between the waypoints—even interferences with thin obstacles which might be missed by prior art methods.

While a number of exemplary aspects and embodiments of the robot collision avoidance motion optimization technique using worst state search and worst state optimization have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for planning a path of an industrial robot, said method comprising:
providing obstacle data defining obstacles in a workspace of the robot;
defining a set of waypoints including a start point and a goal point for the path, and one or more intermediate waypoints;
computing a trajectory through the set of waypoints based on a defined path interpolation method, where a trajectory section is defined as a portion of the trajectory between adjacent waypoints;
defining an arc length parameter as a distance along the trajectory;
performing a worst state search to identify a worst state point in each trajectory section having a worst collision avoidance metric, including identifying the worst state point as a point in a trajectory section having a greatest interference distance into an obstacle when an interference exists;
performing a worst state optimization, using the worst state points, to determine a new set of waypoints;
using the new set of waypoints to compute a trajectory, when the collision avoidance metric does not meet a predefined criteria; and
using the new set of waypoints and a corresponding optimal trajectory by a robot controller to control motion of the robot when the collision avoidance metric meets the criteria.

2. The method according to claim 1 wherein providing obstacle data includes providing the obstacle data from a computer aided design (CAD) system, or providing the obstacle data from one or more sensors configured to detect the obstacles in the workspace.

3. The method according to claim 1 wherein the start point and the goal point define a beginning and ending of the path of a robot tool center.

4. The method according to claim 1 wherein the path interpolation method includes one of linear interpolation, spline interpolation, or another type of nonlinear interpolation.

5. The method according to claim 1 wherein the arc length parameter has a value of zero at the start point and a value of one at the goal point.

6. The method according to claim 1 wherein the collision avoidance metric is a minimum distance from any part of the robot to one of the obstacles, and the criteria is a minimum safe distance which the metric must exceed.

7. The method according to claim 1 wherein performing a worst state search includes finding the worst state point along each trajectory section where a distance from any part of the robot to any of the obstacles is a minimum.

8. The method according to claim 1 wherein performing the worst state optimization includes defining a relationship between the collision avoidance metric and locations of the waypoints based on the worst state points.

9. The method according to claim 8 wherein the relationship is approximated as a Taylor series expansion of the metric of the worst state points as a linear combination of each of the waypoints, where each waypoint term in the series includes a partial derivative of the collision metric with respect to the trajectory defined as a function of the waypoints.

10. The method according to claim 8 wherein performing the worst state optimization includes defining an objective function to be minimized, and using the relationship to define a collision avoidance inequality constraint.

11. The method according to claim 10 wherein the objective function includes a weighted combination of waypoint change distance, trajectory length and trajectory shape terms, where any of the weighting factors may be zero, and the optimization further includes an equality constraint fixing the start and goal points.

12. A method for planning a path of an industrial robot, said method comprising computing a trajectory through a set of waypoints, where a trajectory section is a portion of the trajectory between adjacent waypoints, defining an arc length parameter as a distance along the trajectory, performing a worst state search to identify a worst state point in each trajectory section having a worst collision avoidance metric, including identifying the worst state point as a point in a trajectory section having a greatest interference distance into an obstacle when an interference exists, performing a worst state optimization using the worst state points to determine a new set of waypoints, using the new set of waypoints to compute a trajectory until the collision avoidance metric meets a predefined criteria, and using the new set of waypoints and a corresponding optimal trajectory by a robot controller to control motion of the robot.

13. A path planning system for an industrial robot, said system comprising:
   means for providing obstacle data defining obstacles in a workspace of the robot; and
   a computer in communication with the robot and the means for providing obstacle data, said computer having a processor and memory configured for;
   defining a set of waypoints including a start point and a goal point for the path, and one or more intermediate waypoints;
   computing a trajectory through the set of waypoints using a path interpolation function, where a trajectory section is defined as a portion of the trajectory between adjacent waypoints;
   defining an arc length parameter as a distance along the trajectory;
   performing a worst state search to identify a worst state point in each trajectory section having a worst collision avoidance metric, including identifying the worst state point as a point in a trajectory section having a greatest interference distance into an obstacle when an interference exists;
   performing a worst state optimization, using the worst state points, to determine a new set of waypoints;
   using the new set of waypoints to compute a trajectory, when the collision avoidance metric does not meet a predefined criteria; and
   using the new set of waypoints and a corresponding optimal trajectory to control motion of the robot when the collision avoidance metric meets the criteria.

14. The system according to claim 13 wherein the means for providing obstacle data includes a computer aided design (CAD) system or one or more sensor configured to detect the obstacles in the workspace, where the one or more sensor includes one or more camera, radar sensor, LiDAR sensor, ultrasonic sensor or infrared sensor.

15. The system according to claim 13 wherein the arc length parameter has a value of zero at the start point and a value of one at the goal point.

16. The system according to claim 13 wherein the collision avoidance metric is a minimum distance from any part of the robot to one of the obstacles, and the criteria is a minimum safe distance which the metric must exceed.

17. The system according to claim 13 wherein performing a worst state search includes finding the worst state point along each trajectory section where a distance from any part of the robot to any of the obstacles is a minimum.

18. The system according to claim 13 wherein performing the worst state optimization includes defining a relationship between the collision avoidance metric and locations of the waypoints based on the worst state points.

19. The system according to claim 18 wherein the relationship is approximated as a Taylor series expansion of the metric of the worst state points as a linear combination of each of the waypoints, where each waypoint term in the series includes a partial derivative of the collision metric with respect to the trajectory defined as a function of the waypoints.

20. The system according to claim 18 wherein performing the worst state optimization includes defining an objective function to be minimized, and using the relationship to define a collision avoidance inequality constraint.

* * * * *